United States Patent [19]

Spicer

[11] Patent Number: 4,600,268
[45] Date of Patent: Jul. 15, 1986

[54] CABLE FOR TELECOMMUNICATIONS PURPOSES AND A METHOD OF MANUFACTURING THE SAME

[75] Inventor: Lyndon R. Spicer, Newport, Wales

[73] Assignee: Standard Telephones and Cables Public Limited Co., London, England

[21] Appl. No.: 558,577

[22] Filed: Dec. 6, 1983

[30] Foreign Application Priority Data

Dec. 15, 1982 [GB] United Kingdom ............... 8235740

[51] Int. Cl.⁴ .................................................. G02B 6/44
[52] U.S. Cl. ............................... 350/96.23; 174/113 C
[58] Field of Search ................... 350/96.23; 174/113 C

[56] References Cited

U.S. PATENT DOCUMENTS

| 3,279,031 | 10/1966 | Eyraud et al. | 29/33 |
| 4,037,923 | 7/1977 | Beal | 350/96.23 |

FOREIGN PATENT DOCUMENTS

| 0138539 | 2/1949 | Australia | 174/113 C |
| 1131953 | 9/1982 | Canada . | |
| 476581 | 5/1929 | Fed. Rep. of Germany . | |
| 2541178 | 3/1977 | Fed. Rep. of Germany | 350/96.23 |
| 2641139 | 3/1977 | Fed. Rep. of Germany . | |
| 2948757 | 6/1980 | Fed. Rep. of Germany . | |
| 57-90601 | 6/1982 | Japan | 350/96.23 |
| 586400 | 3/1977 | Switzerland . | |
| 744279 | 2/1956 | United Kingdom . | |
| 783064 | 9/1957 | United Kingdom . | |
| 1061979 | 3/1967 | United Kingdom . | |
| 1242494 | 8/1971 | United Kingdom . | |
| 1445732 | 8/1976 | United Kingdom . | |
| 1451232 | 9/1976 | United Kingdom . | |
| 1488528 | 10/1977 | United Kingdom . | |
| 1501777 | 2/1978 | United Kingdom . | |
| 1499690 | 2/1978 | United Kingdom . | |
| 2036361 | 6/1980 | United Kingdom . | |
| 2060929 | 5/1981 | United Kingdom . | |
| 2069746 | 8/1981 | United Kingdom . | |
| 2104278 | 12/1984 | United Kingdom . | |

*Primary Examiner*—William L. Sikes
*Assistant Examiner*—Frank González
*Attorney, Agent, or Firm*—Kerkam, Stowell, Kondracki & Clarke

[57] ABSTRACT

A cable comprises a central electrically insulating composite string, including a relatively hard strength member filament (8) with a relatively soft layer (9) thereon. Four, in the case of a quad, electrical or optical conductors (10) are at least partially embedded in the softer layer (9) and may abut the filament (8). A polyethylene sheath (11) is extruded over the string. The quad may be made by pressing the conductors against the outer periphery of the string whereby to deform it without heating it, and may involve the use of a die arrangement (FIGS. 3 and 4) which ensures the desired spacing and configuration of the conductors relative to one another, necessary for high quality quads of electrical conductors in order to have low crosstalk, is obtained. The cable construction, which facilitates miniature quad manufacture, is such that cable can be manufactured with a minimum of process stages at high throughput speeds.

6 Claims, 5 Drawing Figures

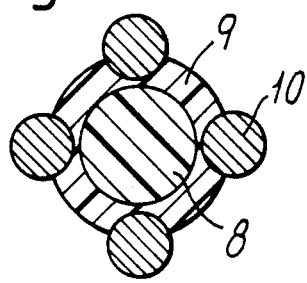
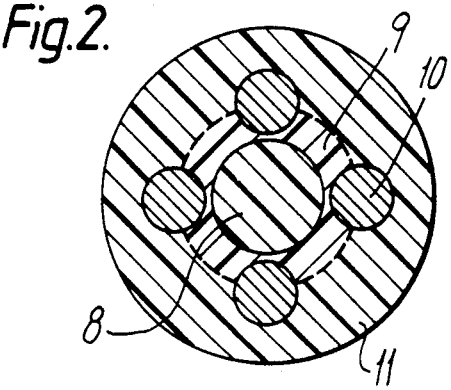
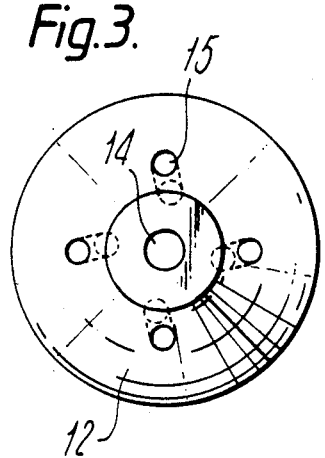
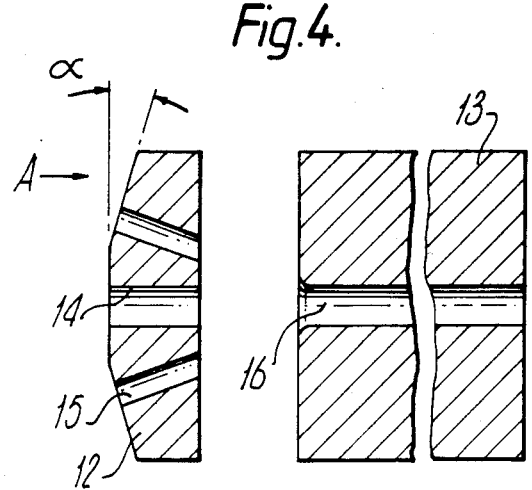
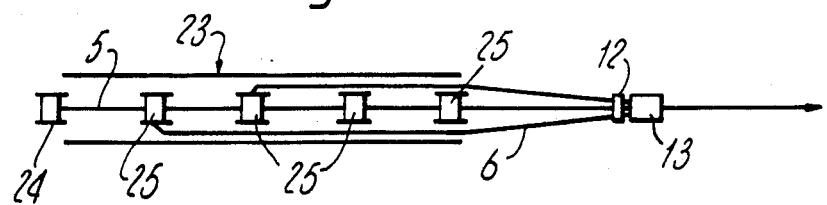

CABLE FOR TELECOMMUNICATIONS PURPOSES AND A METHOD OF MANUFACTURING THE SAME

BACKGROUND OF THE INVENTION

This invention relates to cable manufacture and in particular but not exclusively to the manufacture of quads of electrical conductors for telecommunications cables.

High quality quads of electrical conductors, that is quads with good cross-talk levels, for example, of the order of 70 dB at 1 KHz, are conventionally manufactured by a multi-stage, and therefore expensive, process. There may be up to ten different operations required to manufacture a quad by the conventionally employed method. Basically the conventional method comprises manufacture of a central insulating string; manufacture of conductor wire; manufacture of four separate insulated wires from the conductor wire; rewind and water test the insulated wires for insulation defects; formation of a quad sub-assembly from the insulated wires by stranding them about or laying them up with the central string; and sheathing of the quad sub-assembly with extruded plastics material.

British Patent specification No. 783,064 describes a method of making a quad by heating the conductors and partially forcing them in a matrix (like a die) into a central core of foamed polyethylene in a manufacturing operation. The process is said to be controlled in such manner that, when the core and conductors leave the matrix, the temporarily softened material of the core has already solidified again, so that the conductors are fixed relative to one another, both in the radial and the circumferential direction of the core, in an arrangement which is solely determined by the position of grooves in the matrix.

We believe this cable has never been successfully made. We have found that the application of heat to soften a core as described results in a product which cannot be produced quickly and which does not have accurately spaced conductors to achieve acceptable cross-talk levels.

SUMMARY OF THE INVENTION

According to one aspect of the present invention there is provided a cable for telecommunications purposes comprising a composite central string member, including a relatively hard inner strength member filament with a relatively soft outer layer thereon, in whose outer layer a plurality of spaced-apart electrical or optical conductors are at least partially embedded.

According to another aspect of the present invention there is provided a method of manufacturing a cable for telecommunications purposes including providing a composite central string member having a relatively hard inner strength member filament with a relatively soft outer layer thereon and pressing a plurality of electrical or optical conductors thereagainst whereby to at least partially embed the conductors in the outer layer with a predetermined lay while the conductors are spaced apart with respect to one another.

BRIEF DESCRIPTION OF THE DRAWINGS

Embodiments of the present invention will now be described with reference to the accompanying drawings, in which:

FIG. 1 shows a cross-section through a quad manufactured according to an embodiment of the present invention at an intermediate stage of manufacture;

FIG. 2 shows the completed quad of FIG. 1 although the sub-assembly of FIG. 1 is a complete item in itself;

FIG. 3 shows an inlet end view of the die arrangement of FIG. 4, as seen looking in the direction of arrow 'A';

FIG. 4 shows a longitudinal section through a two portion die arrangement which may be employed in the manufacture of the quad of FIGS. 1 and 2, and FIG. 5 shows, schematically, the use of the die arrangement of FIGS. 3 and 4 in the manufacture of a quad with helically applied conductors.

DETAILED DESCRIPTION OF THE PREFERRED EMBODIMENT

The present invention is concerned with a cable construction employing a composite string member comprising a relatively hard orientated monofilament of high tensile strength (e.g. 18 lbs) with a relatively soft plastics layer provided thereon, for example low density, such as grade 70, polyethylene. An example of such a construction in the form of a quad is shown in FIG. 1 after an intermediate stage of manufacture. It comprises an electrically insulating monofilament 8 of, for example methylpentene, or polyethyleneglycolterephthalate, or high density polyethylene having a layer 9 of grade 70 polyethylene, or another relatively soft plastics layer thereon, in which uninsulated conductors 10, are at least partially embedded by forcing them thereagainst and thereinto without pre-heating the layer 9 or conductors 10. In FIGS. 1 and 2 the conductors 10 are illustrated as almost in contact (abutment) with the strength member 8 but not quite. Instead of electrical conductors they could be optical conductors.

Quite unexpectedly, we have found that provided the layer 9 is of a suitable deformable material, heating is not necessary, although there may be some mechanical advantage provided thereby. As shown in FIG. 2 sheath 11 which comprises high density polyethylene is arranged over the composite central string 8, 9 in whose outer periphery the conductors 10 are embedded.

The two-part die arrangement of FIGS. 3 and 4 ensures that the conductors are precisely positioned with respect to one another and the central string. This two-part die arrangement is simple to manufacture and is not subject to significant wear.

The die arrangement shown in FIGS. 3 and 4 comprises a first die portion or forming die 12 and a second die portion or finishing die 13. The forming die 12 has a central bore 14 of a diameter such that the composite central string 8, 9 may be pulled easily therethrough and four bores or conductor guides 15 which converge in the direction towards the outlet end of forming die 12 as is apparent from FIG. 4. The conductor guides 15 also extend at an angle with respect to the axis of bore 14 as is apparent from FIG. 3. Typically, for electrical conductors, the angle α is 17° and guides 15 are at a compound angle of 17° in two planes. The finishing die 13 is substantially cylindrical with a central bore 16 of a diameter larger than that of bore 14 but smaller than the sum of the diameter of bore 14 and twice the conductor diameter such that conductors 10 guided through guides 15 of die 12 are urged towards and in certain arrangements into contact with strength member 8 and thus become at least partially embedded in the layer 9 during passage through die 13.

The die arrangement shown in FIGS. 3 and 4 may be employed in a stranding arrangement as shown in FIG. 5. The forming die 12 is mounted for rotation about its longitudinal axis, that is the longitudinal axis of bore 14, whereas the finishing die 13 is closely spaced with respect thereto and rigidly mounted, that is, mounted without provision for rotation about its longitudinal axis. The forming die 12 receives conductors 10 and composite central string member 8, 9 from supply reels 25 and a string supply reel 24, respectively, mounted in a conventional wire strander 23 and rotatable with the forming die 12. The conductors 10 and string 29 are pulled through the dies 12 and 13 by a capstan or driven take-up bobbin (not shown). The sheath 11 (FIG. 3) may be extruded onto the quad sub-assembly directly after die 13 by means of an extruder (not shown) arranged in tandem with the strander 23; alternatively a length of quad sub-assembly as shown in FIG. 1 may be sheathed in a separate process after storage on a take-up bobbin. The sheath 11 may or may not become bonded to the remaining periphery of the string, in dependence on the materials and temperatures employed. As a result of passage through the rotating die 12 and non-rotating die 13 the conductors are helically embedded in the periphery of the composite string due to deformation of the outer layer 9 thereof. The deformation is achieved during passage through the die 13. The conductors 10 leave the guides 15 before the conductors touch the layer 9. The helical lay of the conductors ensures that the relative conductor position is maintained when a quad sub-assembly of FIG. 1 is wound on a take-up bobbin prior to sheath extrusion.

Thus manufacturing quads as shown in FIG. 2 requires basically only three steps, that is manufacture of the composite central string, manufacture of the conductors if appropriate, for example by stranding, (for example a seven wire compacted strand) and a process in which the conductors are embedded in the outer periphery of the composite string and then sheathed, although sheath extrusion may be performed as a separate operation if required. The die arrangement 12 and 13 employed to embed the conductors in the string is critical in as much as it must ensure that the four conductors are held in almost perfect symmetry with respect to one another to give good crosstalk levels. The speed of production of quadded conductors using such a die arrangement is very fast in comparison with conventional quadding methods and much simpler with resultant cost savings, particularly in plant and energy requirements.

Whereas the invention has so far been described with reference to cables having quads of conductors, it is equally applicable to the manufacture of cables having other numbers of conductors, for example, six conductors, with suitable modification of the die portion 12 in order to provide six guides 15 etc. In this case cross-talk considerations may not apply. Cables can thus be provided with a number of conductors maintained in a desired configuration and at a desired spacing with respect to one another by a manufacturing process involving a minimum number of operations. The invention is also not restricted to cables with electrical conductors since it can equally well be applied to cables incorporating optical fibres (optical conductors) instead of electrical conductors 10. The fibres may be primary coated or secondary coated fibres, the latter being presently preferred. For optical fibres the lay angle for helically embedded fibres would be of the order of 5°, whereas for electrical conductors the lay angle would be of the order of 17 to 25 degrees although it may be as low as 10 or 12 degrees.

Typical dimensions of a miniature quad shown in FIG. 2 are as follows:

EXAMPLE 1

| | |
|---|---|
| Diameter of monofilament 8 = | 0.46 mm |
| Thickness of extruded layer 9 = (before pressing in the conductors) | 0.125 mm |
| Overall diameter of composite central string | 0.71 mm |
| Overall diameter of central string with embedded conductors is about | 1.00 mm |
| Diameter of conductors 10 = | 0.25 mm |
| Diameter of sheathed cable = | 1.35 mm |

The invention is not, however, restricted to miniature cables and may also be employed for larger cables such as the following dimensions:

EXAMPLE 2

Diameters are as follows:
Monofilament 8 = 0.9 mm
Coated monofilament = 1.54 mm
Conductors = 0.64 mm
Sub-assembly of FIG. 1 = 2.18 mm
Overall diameter as shown in FIG. 2 = 2.82 mm.

The grade 70 polyethylene is inherently soft enough for the conductors to be embedded therein simply upon deformation thereof at ambient temperature by pressing the conductors thereagainst, particularly in view of the harder strength member arranged thereunder. Other suitable soft materials, which are deformable at ambient temperatures by the application of pressure thereto, are cellular polythene or other cellular plastics, PVC, etcetera, in which case the centre monofilament may be proportionally much smaller or even omitted altogether to take advantage of, for example, the dielectric properties of cellular materials.

If the sheath 11 is extruded from high density polyethylene it will bond easily to a composite string whose outer periphery is comprised of grade 70 polyethylene. Such a high density polyethylene outer sheath would provide electrical insulation, mechanical protection and moisture protection. However other sheath materials may be employed and it is not necessary that string and sheath bonding occurs. The conductors need only be partially embedded in the string material since they are protected by the outer sheath material. Whereas in the conventional manufacturing processes a tape may be wound over the quadded conductors to maintain their relative positions, such a tape is not required in the manufacturing method of the present invention.

The cross-talk measurement at 1 KHz on the cable of Example 1 was measured at 67 dB. With tandem extrusion of the final layer this figure will improve.

In the case of the manufacture of quads of electrical conductors in particular, the main advantages of the present invention are the speed of production and the fact that high quality quads of a very small size may be produced. A 4800 pair telephone cable with the pairs made by conventional methods is approximately 3.5 inches in diameter, whereas with the inventive methods this may be reduced to approximately 1.5 inches using fine wires or optical fibre conductors, which are of comparable diameters.

A particular cable construction may include 270 miniature quads which are cabled together, that is arranged in successive layers around a central quad, to form a unit only one inch in diameter. This unit would then be sheathed and provided with an external strength member in the form of a plurality of helically applied steel wires or high tensile strength synthetic elements if necessary.

Quads of electrical conductors manufactured using the present invention have proved to have very good measured cross-talk values and excellent insulation resistance between the conductors. An outer sheath of high density polyethylene will be bonded to a low density polyethylene layer of a central string, so that the individual conductors are truly separately insulated and no moisture paths can be formed between the conductors.

Production speeds in excess of 1000 meters per hour are possible, the bigger the cable the higher the speed.

The machine shown in FIG. 5 would rotate at 3000 r.p.m.

I claim:

1. A method of manufacturing a cable for telecommunications purposes including providing a composite central string member having a relatively hard inner strength member filament with a relatively soft outer layer thereon and pressing a plurality of conductors thereagainst whereby to at least partially embed the conductors in the outer layer with a predetermined lay while the conductors are spaced apart with respect to one another, and including the step of pulling the composite central string member and the conductors through a die arrangement, which die arrangement serves to progressively guide the conductors towards the composite central string member, whilst maintaining them in the desired configuration relative to one another, and cause the conductors to progressively deform the outer layer of the composite central string member whereby the conductors become partially embedded therein.

2. A method as claimed in claim 1, wherein the conductors are pressed into the composite central string member until they almost abut the inner strength member filament.

3. A method as claimed in claim 1, wherein the embedded conductors extend helically with respect to the longitudinal axis of the composite central string member.

4. A method as claimed in claim 1, including applying a sheath of insulating material over the central string member and the conductors in tandem with the pressing operation.

5. A method as claimed in claim 1, wherein the die arrangement includes a die portion with a central longitudinal bore for receiving the composite central string member and a plurality of guides for the conductors, which guides, one for each conductor, comprise respective cylindrical bores whose axes extend generally towards and at an angle relative to the longitudinal axis of the central bore whereby to facilitate helical arrangement of the conductors relative to the longitudinal axis of the composite central string member.

6. A method as claimed in claim 1, including applying a sheath of insulating material over the central string member and conductors after storage of the central string member with the conductors partially embedded therein.

* * * * *